Patented Dec. 19, 1933

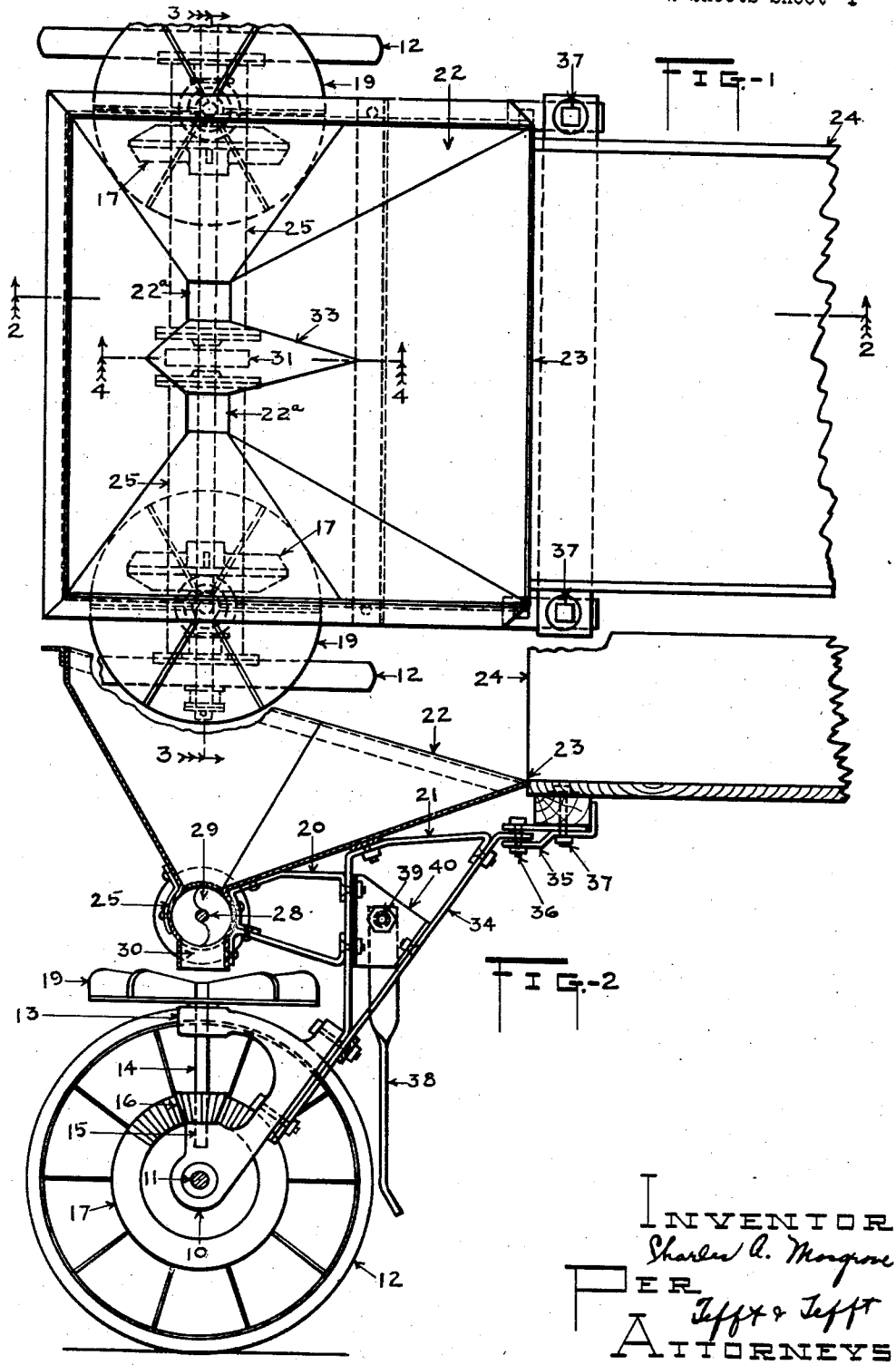

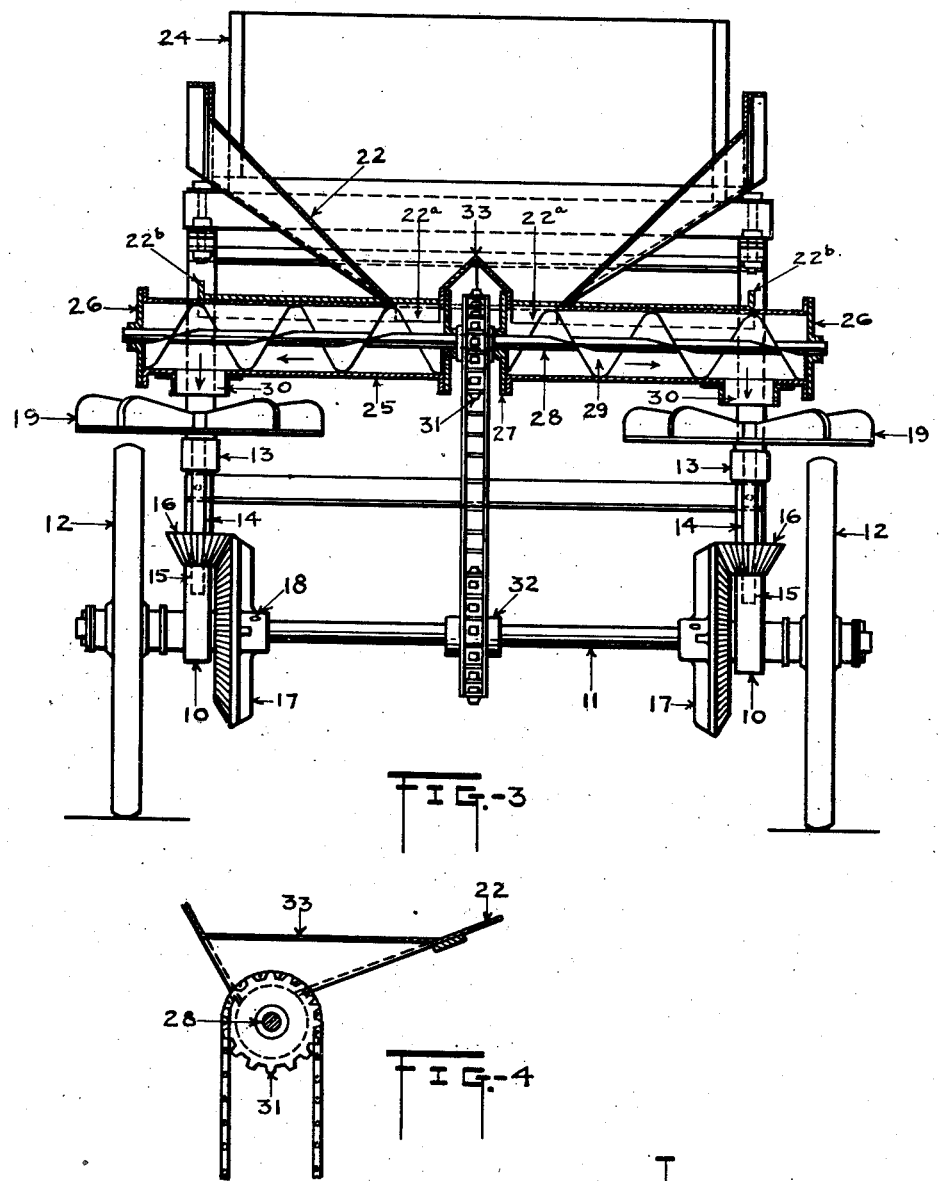

1,940,008

UNITED STATES PATENT OFFICE 1,940,008

DISTRIBUTOR MECHANISM

Charles A. Mosgrove, Mansfield, Ill.

Application January 17, 1930. Serial No. 421,370

2 Claims. (Cl. 275—8)

REISSUED

This invention relates to distributing mechanism.

One of the objects of the invention is in the provision of a distributing mechanism of a character that is capable of attachment or detachment with the ordinary farm wagon.

Another object lies in the provision of a unitary distributing mechanism which is capable of attachment to and detachment from the ordinary farm wagon by the operator thereof, thus obviating the necessity of drawing the distributing mechanism to and from the fields.

Still another object lies in the provision of a distributing mechanism comprising carrying and power transmitting wheels in connection therewith, said distributing mechanism being in itself a unitary structure, but being capable of attachment to or detachment from the ordinary farm wagon.

A further object lies in the provision of a unitary distributing mechanism comprising carrying and power transmitting mechanism in connection therewith, mechanism permitting attachment or detachment with the ordinary farm wagon, and a hopper so connected to the distributing mechanism as to receive material for distribution directly from the wagon.

A still further object lies in the provision of a unitary distributing mechanism having carrying and power transmitting wheels, a hopper fashioned to receive material to be distributed directly from the wagon to which it is adapted to be connected in a detachable manner and means for supporting the unit when inactive but capable of movement to a retracted position when said device is in an operative and connected position with respect to a wagon.

Other objects will appear in the following specification, taken in connection with the annexed drawings, in which—

Fig. 1 is a plan view of my unitary distributing member;

Fig. 2 is a sectional view taken on the line 2—2 of Fig. 1;

Fig. 3 is a rear elevational view; and

Fig. 4 is a sectional view taken on the line 4—4 of Fig. 1.

Before referring to the drawings, it might be stated that the present distributing mechanism is normally adapted to distribute fertilizing material; however, it is apparent that same may just as well be used for the distribution of other materials such as seeds, dusting material, etc.

The structure has been developed primarily with the idea of obviating the difficulties that attend the use of the well known fertilizer distributing mechanism which is either formed as a part of a wagon itself, or more generally attached to the end gate of a conventional farm wagon. Such distributing mechanism obviously is of great weight and when attached to the rear end of a wagon such as ordinarily used on a farm, requires at least two operators to place same in position. Further, when such mechanism actually becomes a part of the farm wagon, it must necessarily be drawn to and from the location of the fertilizer and the fields over which the fertilizer is to be distributed.

The present applicant has devised a manner of associating a distributing mechanism with transmission and power wheels, as well as additional means for providing a detachable connection between the distributing mechanism and an ordinary farm wagon, this for the purpose of providing a distributing mechanism which becomes an implement itself, one which may be attached single handed to a farm wagon, and further, one which may be left in the field when the operator returns with the wagon for another load of fertilizer.

In the drawings, there is shown the framing mechanism 10, which provides at its lower end bearings for an axle 11. Secured to the outer end of the axle in a conventional manner are the transmission and power wheels 12.

Rearwardly projecting brackets 13 provide upper bearing supports for vertical shafts 14, the lower ends of which find bearing supports 15 in the framing 10. Means for rotating the shafts 14 is provided in beveled gears 16 which mesh with beveled gears 17 fixedly secured as at 18 to the rotating axle 11. Upon the upper ends of the vertical shafts 14 are provided the distributing plates or fans 19.

Means for depositing the fertilizer upon the distributing plates 19 is provided in the following mechanism: Supported in an elevated manner by means of framing mechanism 20 and 21 is a material hopper 22, which is fashioned in such manner that not only does it provide a substantial receptacle for material to be distributed, but further same has an inwardly projecting lip 23 which is adapted to lie immediately adjacent the rear end of a conventional farm wagon 24 when attached thereto in the manner later to be described.

In the bottom of the hopper 22 is provided two square openings 22a for conducting fertilizer into conveyor cylinders 25, there being placed immediately above same slidable valve plates 22b for controlling flow of material from the hopper to the conveyors, thence to plural distributing blades.

Located just below plates 22b but connected directly to the bottom of the hopper, are two cylinders 25 having end plates 26 and 27 providing bearing supports for a rotatable member 28 carrying the conventional auger portion 29. It is apparent that due to the manner of positioning the auger that the material will be distributed directly to the plural distributing blades, such material being deposited directly upon the blades through the plural openings 30.

Means for driving the auger is provided in the sprockets 31 and 32 attached to members 28 and 11 respectively. Means is provided for dividing the fertilizer material that same may be deposited in an equal manner upon each of the distributing plates in the upwardly projecting housing or dividing member 33. This member diverts the flow of the fertilizer material, but also completely houses and protects the chain mechanism.

In order to furnish a detachable connection between applicant's unitary distributor mechanism and an ordinary farm wagon, applicant provides the upwardly projecting arms 34, which have apertured ends adapted to be received between bifurcated receiving brackets 35. Conventional bolt members 36 complete the connection between the distributing mechanism and the conventional farm wagon. The bracket mechanism 35 is adapted to be bolted to the farm wagon in the manner shown at 37.

It is apparent that either attachment to the wagon, or detachment therefrom, is accomplished merely by removal of the conventional bolt mechanism. Applicant has shown merely a simple bolted connection between the unitary distributing mechanism and the wagon, but it is apparent that the manner of detaching the unitary distributing mechanism to the wagon might be also accomplished in various ways for instance, by a hook connection between the distributing mechanism and the wagon, which construction would obviate the use of bolts.

In order that the unitary distributing mechanism may be actually an implement itself, means has been provided for supporting same when inoperative or inactive. To accomplish this result, applicant has provided supporting legs 38, pivoted as at 39 to plates 40 which in turn are fixedly secured to the before mentioned framing portion.

The operation of my unitary distributing mechanism is as follows: Considering that the device is in an inoperative position, we will say in the farm yard, at which time the supporting legs 38 are supporting the forward end of the implement, the operator then backs the conventional farm wagon up to the implement and single handed, attaches the same to the wagon by merely bolting the connecting means thereof to the rear end of the wagon. As stated before, this connection might as well be in the nature of hooks or the like.

Having connected the implement to the wagon, it is apparent that the forward end or lip of the material hopper lies immediately adjacent the rear end of the wagon. The operator may have previously filled the wagon with fertilizer or he may thereafter do so. However, the wagon is then drawn to the field, the end gate of the wagon is elevated and the material then flows directly into the receiving hopper of the distributing mechanism. As the wagon passes through the field, obviously the fertilizer will flow directly into the hopper and a satisfactory covering of the field by the fertilizer will result.

When the fertilizer within the wagon has been exhausted, the operator has then merely to detach the distributing member from the wagon, drive the wagon back to the location of the fertilizer, refill the wagon and return to the distributor and again secure same to the refilled wagon by simple attachment of the bolt members herein described.

Obviously, whenever detached from the farm wagon, the distributor is maintained in an elevated position by means of the supporting legs 38.

It is apparent that applicant's fertilizer distributing mechanism might be changed, as far as the actual mechanism itself is concerned, for distribution of the fertilizer; in other words, a single rotatable plate member might be used for the distribution of the fertilizer, or the driving mechanism therefor might be changed materially without departing from the spirit of the invention.

What I claim is:

1. A unitary distributing trailer comprising a frame, means on the frame for detachably engaging the rear of a power vehicle, transmission wheels supporting the frame, radially bladed discs mounted for rotation on a substantially vertical axis, beveled gear means driven by said transmission wheels for simultaneously driving said discs, said discs being disposed above said transmission wheels and extending laterally across the plane of said wheels, a hopper mounted on said frame and having centrally spaced openings, a pair of screw conveyors mounted for rotation on a common axis substantially parallel to the plane of said discs, casings enclosing said screw conveyors, said casings having upper openings in alignment with the spaced openings in the hopper and lower openings directly above said discs, and means connected to said transmission wheels for driving said conveyors.

2. A unitary distributing trailer comprising a frame, means on the frame for detachably engaging the rear of a power vehicle, transmission wheels supporting the frame, an axle for said wheels, radially bladed discs mounted for rotation on a substantially vertical axis, beveled gear means driven by said transmission wheels for simultaneously driving said discs, said discs being disposed above said transmission wheels and extending laterally across the plane of said wheels, a hopper mounted on said frame and having centrally spaced openings, a pair of screw conveyors mounted for rotation on a common axle substantially parallel to the plane of said discs, casings enclosing said screw conveyors, said casings having upper openings in alignment with the spaced openings in the hopper and lower openings directly above said discs, a sprocket wheel fixedly mounted between said casings on the common axle of said screw conveyors, a sprocket wheel fixedly mounted on the axle for said transmission wheels, and an endless chain connecting said sprocket wheels.

CHARLES A. MOSGROVE.